United States Patent [19]

Watanabe et al.

[11] Patent Number: 5,068,052
[45] Date of Patent: Nov. 26, 1991

[54] RESIN COMPOSITION CONTAINING SMECTIC LIQUID CRYSTAL

[75] Inventors: Junji Watanabe, Yokohama; Michiro Naka, Fuji; Kenji Hijikata, Mishima, all of Japan

[73] Assignee: Polyplastics Co., Ltd., Osaka, Japan

[21] Appl. No.: 285,424

[22] Filed: Dec. 16, 1988

[30] Foreign Application Priority Data

Dec. 25, 1987 [JP] Japan .................................. 62-329237

[51] Int. Cl.$^5$ .............................................. C09K 19/52
[52] U.S. Cl. ............................ 252/299.01; 252/299.5; 428/1; 525/432
[58] Field of Search ............ 252/299.01, 299.5, 299.66, 252/299.68; 428/1; 525/432

[56] References Cited

U.S. PATENT DOCUMENTS

| | | | |
|---|---|---|---|
| 4,434,262 | 2/1984 | Buckley et al. | 524/237 |
| 4,581,399 | 4/1986 | Yoon | 524/246 |
| 4,685,771 | 8/1987 | West et al. | 350/347 V |
| 4,778,858 | 10/1988 | Ginnings | 525/425 |
| 4,798,849 | 1/1989 | Thomas et al. | 521/114 |
| 4,904,747 | 2/1990 | Morris et al. | 252/299.01 X |

FOREIGN PATENT DOCUMENTS

| | | | |
|---|---|---|---|
| 0227299 | 7/1987 | European Pat. Off. | |
| 49-076947 | 7/1974 | Japan | 252/299.5 |
| 58-091759 | 5/1983 | Japan. | |
| 61-047427 | 3/1986 | Japan. | |
| 61-236821 | 10/1986 | Japan | 252/299.5 |
| 62-173410 | 7/1987 | Japan. | |

OTHER PUBLICATIONS

"Crystallization Behavior of Semi-Flexible Liquid Crystalline Polyesters and Their Blends," Yoo et al., Polymer Journal (Tokyo), 20(12), pp. 1117-1124 (1988).
"Thermal Behavior of the Smectic/Nematic Thermotropic Liquid Crystalline Polyester Blends," Yoo et al., Polymer Bulletin 18, pp. 247-252 (1987).
"Polimerizáció folyadékkristályban", XIX., Horvath et al., Magyar Kémiai Folyóirat 91(4), pp. 167-177 (1985).
"Blends of a Chlorinated Poly(Vinyl Chloride) Compound and a Thermotropic Liquid Crystalline Copolyester: Some Rheological Behavior and Spiral Mold Flow", B. L. Lee, Polymer Engineering and Science, 28(17), pp. 1107-1114 (Mid-Sep. 1988).
"How Well Do Various Blends of LCP and Nylon 12 Work?," T. S. Chung, Plastics Engineering, 43(10), pp. 39-41 (1987).
"Polyblends Containing a Liquid Crystalline Polymer," A. Siegmann et al., Polymer, vol. 26 (1985).
CA(80) 37881r, 1974.
Krigbaum, W. et al. J. Polym. Sci., Polym. Lett. Ed., 20(2) 109, 1982.
Meurisse, P. et al. Br. Polym. J., 13(2), 55, 1981.
Watanabe, J. et al. Macromolecules, 21(1) 278 1988.
Ober, C. K.; Jin, J.-I.; Lenz, R. W. in Advances in Polymer Science 59, M. Gordon, ed., Springer-Verlag, Berlin, 1984, 104-143.

Primary Examiner—John S. Maples
Assistant Examiner—Richard Treanor
Attorney, Agent, or Firm—Burns, Doane, Swecker & Mathis

[57] ABSTRACT

A resin composition comprises a thermoplastic polymer and a smectic liquid crystal compound and is useful for fibers and film having been improved in mechanical properties.

10 Claims, No Drawings

RESIN COMPOSITION CONTAINING SMECTIC LIQUID CRYSTAL

The present invention relates to a resin composition exhibiting not only excellent melt behavior during processing but also excellent mechanical properties, particularly excellent impact strength and thermal deformation temperature after molding.

PRIOR ART

In order to prepare a material having good performance and excellent processability, various properties have been imparted to a thermoplastic polymer through preparation of various composite materials. In particular, a composite material, having excellent mechanical strengths, lightness of weight, and high heat resistance is of prime importance when one seeks a substitute for a metal. As is well known, fibrous reinforcing materials, particularly glass fibers, have been extensively used in preparing a composite material. However, these materials have various drawbacks, such as incorporation of air bubbles, abrasion of an extruder, increased viscosity during processing, poor dispersion, and poor boundary adhesion, which makes it impossible to prepare an ideal composite material. As an expedient for solving the above-described various problems, an attempt has been made to develop a reinforcing function within the matrix resin in order to improve the thermal deformation temperature and impact strength. As an ultimate goal of the above-described attempts, Takayanagi et al. have proposed a concept of a molecular composite in Japanese Patent Laid-Open No. 65747/1979.

Since, however, the polymer skeleton responsible for the reinforcement is rigid, the polymer exhibits a property as a nematic liquid crystal during melting and is incompatible with a commonly used matrix polymer exhibiting an isotropic phase, which makes it impossible to attain a molecular dispersion. Further, from a morphological standpoint, it is difficult to disperse the polymer in fibrous form without application, of a special stress, such as shearing, so that the desired function cannot be sufficiently exhibited.

SUMMARY OF THE INVENTION

In view of the above-described problems, the present inventors have made extensive and intensive studies with a view to developing an excellent composite material. As a result, the present inventors have noticed that an organic compound having a melting point below the processing temperature of the matrix polymer brings about none of the incorporation of air bubbles, the significant increase in the viscosity during processing, and the risk of abrasion of the extruder and further continued the studies. As a result, the present inventors have found that among the above-described organic compounds, a compound exhibiting a special liquid crystal state has a reinforcing effect and brings about an effect of improving the thermal deformation temperature and the impact strength, which has led to the completion of the present invention.

Accordingly, the present invention relates to a resin composition characterized by comprising a thermoplastic polymer and a smectic liquid crystal compound incorporated therein.

The reason why the above-described phenomenon is characteristic of a smectic liquid crystal compound has not been fully elucidated as yet. However, it is believed that a mechanism is operative whereby a more highly ordered structure is achieved which enables the development of a layered structure characteristic of a smectic liquid crystal which cannot be obtained by a nematic liquid crystal. The occurrence of such a phenomenon in a matrix polymer is an unexpected matter which is very difficult to infer from the case of a nematic liquid crystal.

The smectic liquid crystal compound used in the present invention has a layered structure wherein the molecules are arranged in parallel with the molecular axis with each center of gravity of the parallelly arranged portion on the same plane and the planes are arranged in layers at substantially right angles to the molecular axis, as described in readily available publications, e.g., Shigeo Iwayanagi, "Eki-sho (liquid crystal)" published by Kyoritsu Shuppan Co., Ltd., 1984. Further, it is known that the smectic liquid crystal compound exhibits particular patterns, such as batonet, mosaic and fan-like structures, when observed under a crossed nicol microscope.

Compounds exhibiting the above-described peculiar properties must have both a mesogen exhibiting rigidity and a soft spacer as a flexible group in the same molecule. Low molecular weight compounds exhibiting such properties are described in detail in, e.g., Hans Kelker and Rolf Hatz, "Handbook of Liquid Crystals" published by Verlag Chemie, 1980. It is preferred that the smectic liquid crystal compound used in the present invention have a molecular weight of 250 or more and a melting point of 50° C. or above and below the processing temperature of the thermoplastic polymer. The structure of the smectic liquid crystal compound is preferably such that at least two benzene rings are contained in its molecular skeleton as the mesogen and the alkyl group of the soft spacer has at least two carbon atoms.

Representative examples of the smectic liquid crystal compound include ethyl p-azoxybenozate represented by the formula:

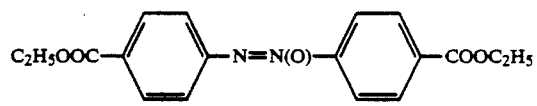

ethyl p-azoxycinnamate represented by the formula:

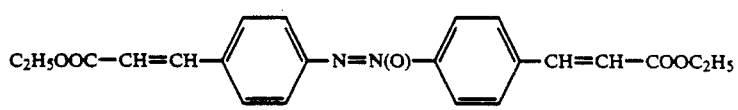

hexyl p-azoxycinnamate represented by the formula:

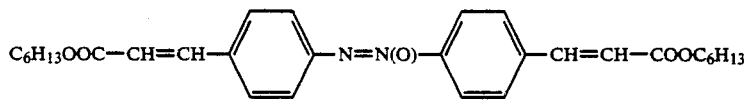

n-amyl p-n-alkoxybenzylidene-p-aminocinnamate represented by the formula:

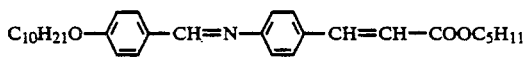

and terephthalylidenebis(4-n-butylaniline) represented by the formula:

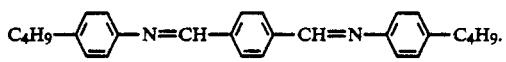

An oligomer and/or a polymer having at least two repeating units each comprising the above-described mesogen and soft spacer are also preferable as the smectic liquid crystal compound. In particular, a polyalkylene biphenyldicarboxylate represented by the following formula (1) wherein the mesogen has a biphenylene skeleton and the soft spacer comprises an alkyl group having at least two carbon atoms is most suitable as the smectic liquid crystal compound:

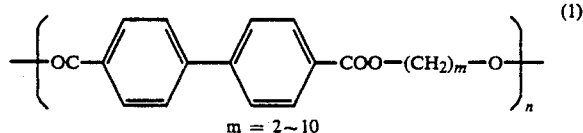

wherein m is 2 to 10.

In the present invention, examples of the thermoplastic polymer which is used as the matrix resin include polyolefins such as polyethylene, polypropylene, and polybutylene; copolymers such as ethylene-propylene copolymer, ethylene-vinyl acetate copolymer, and ABS; polymers of acrylic acid, acrylic esters, acrylonitrile, etc.; vinyl halide polymers such as polyvinyl chloride, polyvinylidene chloride, and polyvinylidene fluoride; vinyl polymers such as polystyrene and polyvinyl acetate; oxy polymers such as polyphenylene oxide, polyoxymethylene, and polyethylene oxide; polyamides such as nylon 6, nylon 66, nylon 610, and nylon 12; nitrogen-containing polymers such as polyurea, polyether imide, polyimide, and polyamic acid; oxygen-containing and sulfur-containing polymers such as polysulfone, polyketone, polyether ketone, polyether ether ketone, and polyphenylene sulfide; polyalkylene terephthalates such as polyethylene terephthalate, polypropylene terephthalate, and polybutylene terephthalate; polyesters such as polyacrylate, liquid crystal polyester, and polycarbonate; and thermoplastic cellulose and thermoplastic urethanes.

Among the above-described thermoplastic polymers, the use of a crystalline polymer is preferable, and a crystalline polymer having a melting point exceeding 100° C. is particularly preferable.

Preferable examples of the thermoplastic polymer include polyoxymethylene, polyphenylene oxide, polyamide, polyalkylene terephthalate, polycarbonate, polyacrylate, and liquid crystal polyester. Particularly preferable examples of the thermoplastic polymer include polyalkylene terephthalates, such as polyethylene terephthalate, polypropylene terephthalate, and polybutylene terephthalate, and their derivatives, and liquid crystal copolyesters containing a hydroxybenzoic acid residue.

An optimum combination of a smectic liquid crystal compound with a thermoplastic polymer is a combination of a polyalkylene biphenyldicarboxylate comprising an alkyl group having at least 4 carbon atoms as the smectic liquid crystal compound with a polyalkylene terephthalate comprising an alkyl group having 2 to 4 carbon atoms as the thermoplastic polymer.

Although the proportion of the smectic liquid crystal compound incorporated in the thermoplastic polymer may be arbitrary, it is preferred to add the smectic liquid crystal compound in an amount of 0.01 to 50 parts by weight based on 100 parts by weight of the thermoplastic polymer. When the proportion exceeds 50 parts by weight, the thickening effect during melting is enhanced, which brings about an increase in the load during processing.

The above-described resin compositions may be mixed with commonly used various additives, fillers, reinforcing agents, etc. by processes known to a person having ordinary skill in the art for the purpose of further imparting necessary functions.

The resin composition may be incorporated in an ordinary extruder during the step of granulation or previously added and mixed immediately before the completion of the step of polymerization.

The resin composition prepared in the present invention has improved melt strength, is less susceptible to drawdown and exhibits excellent melt processability particularly into a film and a fiber. Further, the molded product after shaping has not only improved high thermal deformation temperature but also improved impact strength. The above-described properties render the resin composition suitable for use in various fields such as injection molding and extrusion to give films, sheets, fibers, etc.

EXAMPLES

The present invention will now be described in more detail with reference to the following Examples, though the present invention is not limited to these Examples only.

EXAMPLE 1

It was confirmed by means of a polarization microscope equipped with a hot stage manufactured by Rimcome that hexyl p-azoxycinnamate (hereinafter abbreviated to "HAC") exhibited a fan-like pattern characteristic of a smectic liquid crystal compound at 95° C., exhibited a transition into an isotropic phase at 189° C., and exhibited a precipitation having a batonet pattern in the course of cooling.

Seven parts by weight of HAC was added to 100 parts by weight of polyoxymethylene (Duracon M-90; a product of Polyplastics Co., Ltd.) and kneaded in an ordinary extruder. Thereafter, a specimen was prepared from the mixture with an injection molding machine.

The specimen was subjected to measurement of thermal deformation temperature and Izod impact strength according to ASTM D-648 (18.6 kgf/cm$^2$) and ASTM D-256 (notch side), respectively.

Further, the melt strength was measured in a molten state at 190° C. at a drawdown speed of 50 m/min with a Capirograph manufactured by Toyo Seiki Seisakusho. The results are shown in Table 1.

EXAMPLE 2

Ethyl p,p'-biphenylenedicarboxylate and octamethylenediol were melt-polymerized in the presence of a catalyst comprising isopropyl orthotitanate in a nitrogen atmosphere for 5 hr while gradually raising the temperature to 270° C., thereby preparing a polymer having a structure shown in Table 1 (hereinafter abbreviated to "BB-8").

It was confirmed that as with HAC used in Example 1, BB-8 thus prepared exhibited a fan-like pattern characteristic of a smectic liquid crystal compound at 139° C. or above and caused transition into an isotropic phase at 171° C.

Further, BB-8 brought about batonet precipitation in the course of cooling. These facts substantiate that BB-8 is a smectic liquid crystal compound.

A specimen was prepared and evaluated in the same manner as that of Example 1, except that BB-8 was used as the smectic liquid crystal compound.

Further, the melt strength was measured in the same manner as that of Example 1.

The results are shown in Table 1.

COMPARATIVE EXAMPLE 1

A specimen was prepared and evaluated in the same manner as that of Example 1 except that only polyoxymethylene was used.

The results are shown in Table 1.

COMPARATIVE EXAMPLE 2 p,p'-Azoxyphenetole (hereinafter abbreviated to "PAP") was observed under a polarization microscope in the same manner as that of Example 1. As a result, it was found that PAP exhibited a schlieren pattern characteristic of a nematic liquid crystal compound at 137° C. and caused transition into an isotropic phase at 168° C.

A specimen was prepared and evaluated in the same manner as that of Example 1 except that PAP was used instead of the smectic liquid crystal compound.

The results are shown in Table 1.

EXAMPLE 3

It was confirmed in the same manner as that of Example 1 that ethyl p-azoxycinnamate (hereinafter abbreviated to "EAC") was in a state of a smectic liquid crystal at 136° to 267° C.

The measurement of physical properties was conducted in the same manner as that of Example 1, except that 7 parts by weight of EAC was added as the smectic liquid crystal compound to 100 parts by weight of polybutylene terephthalate (DX-2002; a product of Polyplastics Co., Ltd.).

Further, the melt strength was measured in the same manner as that of Example 1, except that the measurement was conducted at 240° C. in a molten state.

The results are shown in Table 1.

EXAMPLE 4

A polymer was prepared from ethyl p,p'-biphenylenedicarboxylate and hexamethylenediol in the same manner as that of Example 2 (hereinafter abbreviated to "BB-6").

It was confirmed in the same manner that BB-6 was in a state of a smectic liquid crystal at 143° to 211° C.

The measurement of physical properties was conducted in the same manner as that of Example 3, except that BB-6 was used as the smectic liquid crystal compound.

The results are shown in Table 1.

COMPARATIVE EXAMPLE 3

A specimen was prepared and subjected to the measurement of physical properties in the same manner as that of Example 3 except that only polybutylene terephthalate was used.

The results are shown in Table 1.

COMPARATIVE EXAMPLE 4

A liquid crystal polymer (Vectra A-950; a product of Polyplastics; hereinafter abbreviated to "VR") was observed in the same manner as that of Example 1. As a result, it was found that VR exhibited a fibrous pattern characteristic of a nematic liquid crystal at 280° C. or above.

Seven parts by weight of VR was extruded together with 100 parts by weight of polybutylene terephthalate at 280° C. at which both substances melted. The extrusion product was kneaded and then molded into a specimen.

The specimen was subjected to the measurement of physical properties in the same manner as that of Example 3. The results are shown in Table 1.

EXAMPLE 5

150 parts by weight of acetoxybenzoic acid was added to 100 parts by weight of polybutylene terephthalate (inherent viscosity: 0.5). The mixture was melt-polymerized in the presence of a catalyst composed of antimony trioxide and potassium acetate in a nitrogen atmosphere for 5 hr while gradually raising the temperature to 260° C., and the reaction system was then evacuated, thereby preparing a polymer (hereinafter abbreviated to "LCP"). It was confirmed from the amount of generated acetic acid that a predetermined amount of acetoxybenzoic acid was reacted.

LCP thus prepared had an I.V. of 0.6 and exhibited a fibrous pattern characteristic of a nematic liquid crystal at 221° C. when observed under a polarization microscope.

LCP was used as the thermoplastic polymer and BB-6 was added thereto in the same manner as that of Example 4. A specimen was prepared from the mixture and then subjected to the measurement of physical properties in the same manner as that of Example 4.

The results are shown in Table 1.

COMPARATIVE EXAMPLE 5

A specimen was prepared and then subjected to the measurement of physical properties in the same manner as that of Example 4 except that no BB-6 as a smectic liquid crystal compound was added.

The results are shown in Table 1.

TABLE 1

| Ex. and Comp. Ex. | thermoplastic polymer | structure of liquid crystal compound [ ]: type of liquid crystal | temp. of transition into isotropic phase (°C.) | amount of addition (based on 100 pts. wt. of thermoplastic resin (pts. wt.) | thermal deformation temp. (°C.) | Izod impact strength (kgf·cm/cm) | melt strength (g) |
|---|---|---|---|---|---|---|---|
| Ex. 1 | polyoxymethylene | $C_6H_{13}OOC-CH=CH-\phi-N=N(O)-\phi-CH=CH-COOC_6H_{13}$ [smectic liquid crystal compound] | 189 | 7 | 130 | 7.4 | 1.70 |
| Ex. 2 | " | $+OOC-\phi-\phi-COO-(CH_2)_8+_n$ [smectic liquid crystal compound] | 171 | 7 | 155 | 8.5 | 2.55 |
| Comp. Ex. 1 | " | — | — | — | 110 | 6.5 | 0.81 |
| Comp. Ex. 2 | " | $C_2H_5O-\phi-N=N(O)-\phi-OC_2H_5$ [nematic liquid crystal compound] | 168 | 7 | 115 | 6.7 | 0.92 |
| Ex. 3 | polybutylene terephthalate | $C_2H_5OOC-CH=CH-\phi-N=N(O)-\phi-CH=CH-COOC_2H_5$ [smectic liquid crystal compound] | 267 | 7 | 110 | 5.5 | 1.58 |
| Ex. 4 | polybutylene terephthalate | $+OOC-\phi-\phi-COO-(CH_2)_6+_n$ [smectic liquid crystal compound] | 211 | 7 | 165 | 6.2 | 2.36 |
| Comp. Ex. 3 | polybutylene terephthalate | — | — | — | 78 | 3.5 | 0.33 |
| Comp. Ex. 4 | polybutylene terephthalate | VR [nematic liquid crystal compound] | — | 7 | 82 | 4.1 | 0.37 |

TABLE 1-continued

| Ex. and Comp. Ex. | Liquid crystal compound added | | | | Physical properties of resin composition | | |
| --- | --- | --- | --- | --- | --- | --- | --- |
| | thermoplastic polymer | structure of liquid crystal compound [ ]: type of liquid crystal | temp. of transition into isotropic phase (°C.) | amount of addition (based on 100 pts. wt. of thermoplastic resin) (pts. wt.) | thermal deformation temp. (°C.) | Izod impact strength (kgf · cm/cm) | melt strength (g) |
| Ex. 5 | LCP | $\left[\text{OOC}-\!\!\bigcirc\!\!-\!\!\bigcirc\!\!-\text{COO}-(CH_2)_6\right]_n$ [smectic liquid crystal compound] | 211 | 7 | 185 | 7.2 | 1.74 |
| Comp. Ex. 5 | " | — | — | — | 115 | 6.0 | 0.21 |

We claim:

1. A resin composition capable of undergoing melt processing to form improved shaped articles comprising 100 parts by weight of a thermoplastic polymer which is incapable of assuming a smectic liquid crystal state selected from the group consisting of polyoxymethylene and a liquid crystal polyester containing recurring oxybenzoyl units and 0.01 to 50 parts by weight of a polyalkylene biphenyldicarboxylate smectic liquid crystal compound having repeating units, each repeating unit comprising a mesogen and a soft spacer of the formula:

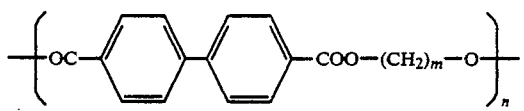

where m is 2 to 10 and n is at least 2, said polyalkylene biphenyldicarboxylate smectic liquid crystal compound being incorporated in intimate admixture throughout said thermoplastic polymer.

2. A resin composition according to claim 1, wherein said smectic liquid crystal compound has a melting point of 50° C. or above for the transition from the solid to the smectic liquid crystal state.

3. A resin composition according to claim 1, wherein said smectic liquid crystal compound has a molecular weight of 250 or more.

4. A resin composition according to claim 1, wherein said soft spacer of said smectic liquid crystal compound is an alkyl group having at least 4 carbon atoms.

5. A resin composition according to claim 1, wherein said soft spacer of said smectic liquid crystal compound has 4 to 10 carbon atoms.

6. A resin composition according to claim 1, wherein said smectic liquid crystal compound has a melting point below a processing temperature of said thermoplastic polymer constituting a matrix.

7. A resin composition according to claim 1 wherein m of said polyalkylene biphenyldicarboxylate liquid crystal compound is 6.

8. A resin composition according to claim 1 wherein m of said polyalkylene biphenyldicarboxylate smectic liquid crystal compound is 8.

9. A resin composition according to claim 1 wherein said thermoplastic polymer which is incapable of assuming a smectic liquid crystal state is polyoxymethylene.

10. A resin composition according to claim 1 wherein said thermoplastic polymer which is incapable of assuming a smectic liquid crystal state is a liquid crystal polyester containing recurring oxybenzoyl units.

* * * * *